(12) United States Patent
Yao et al.

(10) Patent No.: US 10,114,248 B2
(45) Date of Patent: Oct. 30, 2018

(54) LIQUID CRYSTAL DISPLAY PANEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Poping Shen, Xiamen (CN); Long Zhang, Xiamen (CN); Ting Zhou, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 417 days.

(21) Appl. No.: 14/996,166

(22) Filed: Jan. 14, 2016

(65) Prior Publication Data

US 2016/0238887 A1 Aug. 18, 2016

(30) Foreign Application Priority Data

Feb. 13, 2015 (CN) .......................... 2015 1 0078127

(51) Int. Cl.
*G02F 1/1335* (2006.01)
*G02F 1/1337* (2006.01)

(52) U.S. Cl.
CPC .. G02F 1/133528 (2013.01); G02F 1/133707 (2013.01); G02F 1/133753 (2013.01);
(Continued)

(58) Field of Classification Search
CPC ... G02F 1/133753; G02F 2001/133538; G02F 2001/133757
See application file for complete search history.

(56) References Cited

U.S. PATENT DOCUMENTS

| 2016/0238884 A1* | 8/2016 | Zhang | G02F 1/133528 |
| 2016/0238888 A1* | 8/2016 | Yao | G02F 1/133528 |
| 2016/0238889 A1* | 8/2016 | Zhang | G02F 1/133528 |

FOREIGN PATENT DOCUMENTS

| CN | 2699329 Y | 5/2005 |
| CN | 102681271 A | 9/2012 |

(Continued)

*Primary Examiner* — Phu Vu
(74) *Attorney, Agent, or Firm* — Anova Law Group, PLLC

(57) ABSTRACT

A liquid crystal display panel includes a first substrate and a second substrate arranged opposite to the first substrate, a liquid crystal layer disposed between the first substrate and the second substrate, a first alignment layer, a second alignment layer, a first organic film layer, and a second organic film layer. The display panel includes a plurality of regions arranged in an array, and n regions form a region group, n being an integer and n≥3. The first alignment layer has a first alignment direction and is disposed on the first substrate, and the first alignment direction in each of the n regions is different. The second alignment layer has a second alignment direction and is disposed on the second substrate, the second alignment direction in each of the n regions is different, and the second alignment direction is same as the first alignment direction in a same region.

20 Claims, 12 Drawing Sheets

(52) U.S. Cl.
CPC .............. *G02F 1/133788* (2013.01); *G02F 2001/133531* (2013.01); *G02F 2001/133538* (2013.01); *G02F 2001/133757* (2013.01)

(56) References Cited

FOREIGN PATENT DOCUMENTS

| | | |
|---|---|---|
| CN | 103163692 A | 6/2013 |
| CN | 203444212 U | 2/2014 |
| CN | 103645590 A | 3/2014 |
| CN | 103728783 A | 4/2014 |
| JP | 5477884 B2 | 4/2014 |

\* cited by examiner

LIQUID CRYSTAL DISPLAY PANEL AND FABRICATION METHOD THEREOF

CROSS-REFERENCES TO RELATED APPLICATIONS

This application claims priority of Chinese Patent Application No. 201510078127.X, filed on Feb. 13, 2015, the entire contents of which are hereby incorporated by reference.

FIELD OF THE INVENTION

The present disclosure generally relates to the field of display technologies and, more particularly, relates to a liquid crystal display panel and fabrication method thereof, and a liquid crystal display device comprising a liquid crystal display panel.

BACKGROUND

Liquid crystal display (LCD) devices have many advantages, such as light weight, small thickness, and low power consumption, etc., and are widely used in televisions, mobile phones, monitors and other electronic products.

Because their production process is relatively simple, twisted-nematic-mode liquid crystal display devices are currently widely used, but their viewing angles are relatively small. To increase the viewing angle, an in-plane electric field driving type liquid crystal display device has been developed. The existing in-plane electric field driving type liquid crystal display device may provide a larger viewing angle and good performances.

However, the existing in-plane electric field driving type liquid crystal display device has an issue of color shift in vision. FIG. 1 is a schematic diagram of an existing in-plane electric field driving type liquid crystal display device. As shown in FIG. 1, an existing in-plane electric field driving type liquid crystal display panel comprises a plurality of intersecting scan lines 24 and data lines 25, and a plurality of pixel units. Each pixel unit has a stripe-shaped electrode 22 and liquid crystal molecules. Because the liquid crystal molecules have optical anisotropy, they have different optical properties observed from different angles.

In the pixel units, the directions of the stripe-shaped electrodes are arranged in a same direction, and the initial alignment directions of the liquid crystal molecules are also the same. Therefore, the color of the liquid crystal display device viewed from one angle and the color of the liquid crystal display device viewed from another angle may be different, and so the display effects can be undesirable. Therefore, the performance of the existing in-plane electric field driving type liquid crystal display device needs to be further improved.

The disclosed structures and their fabrication methods are directed to solve one or more problems set forth above and other problems in the art.

BRIEF SUMMARY OF THE DISCLOSURE

One aspect of the present disclosure includes a liquid crystal display panel. The liquid crystal display panel includes a first substrate and a second substrate arranged opposite to the first substrate, a liquid crystal layer disposed between the first substrate and the second substrate, a first alignment layer, a second alignment layer, a first organic film layer, and a second organic film layer. The display panel includes a plurality of regions arranged in an array, and n regions form a region group, n being an integer and n≥3. The first alignment layer has a first alignment direction and is disposed on the first substrate, and the first alignment direction in each of the n regions is different. The second alignment layer has a second alignment direction and is disposed on the second substrate, the second alignment direction in each of the n regions is different, and the second alignment direction is same as the first alignment direction in a same region. The first organic film layer has a first polarization direction and is disposed on the first substrate, the first polarization direction in each of the n regions is different. The second organic film layer has a second polarization direction and is disposed on the second substrate, the second polarization direction in each of the n regions is different, and the first alignment directions of at least two regions of the n regions are perpendicular with each other.

Another aspect of the present disclosure includes a method for fabricating a liquid crystal display panel. The method includes providing a first substrate and a second substrate arranged opposite to the first substrate, wherein the display panel includes a plurality of regions arranged in an array, and n regions form a region group, n being an integer and n≥3. The method includes forming a first alignment layer on the first substrate having a first alignment direction, the first alignment direction in each of the n regions being different, wherein the first alignment directions of at least two regions of the n regions are perpendicular with each other. The method also includes forming a second alignment layer on the second substrate having a second alignment direction, the second alignment direction in each of the n regions being different, wherein the second alignment direction is same as the first alignment direction in a same region. The method also includes forming a first organic film layer on the first substrate having a first polarization direction, the first polarization direction in each of the n regions being different. The method also includes forming a second organic film layer on the second substrate having a second polarization direction, the second polarization direction in each of the n regions being different. Further, The method includes forming a liquid crystal layer disposed between the first substrate and the second substrate.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
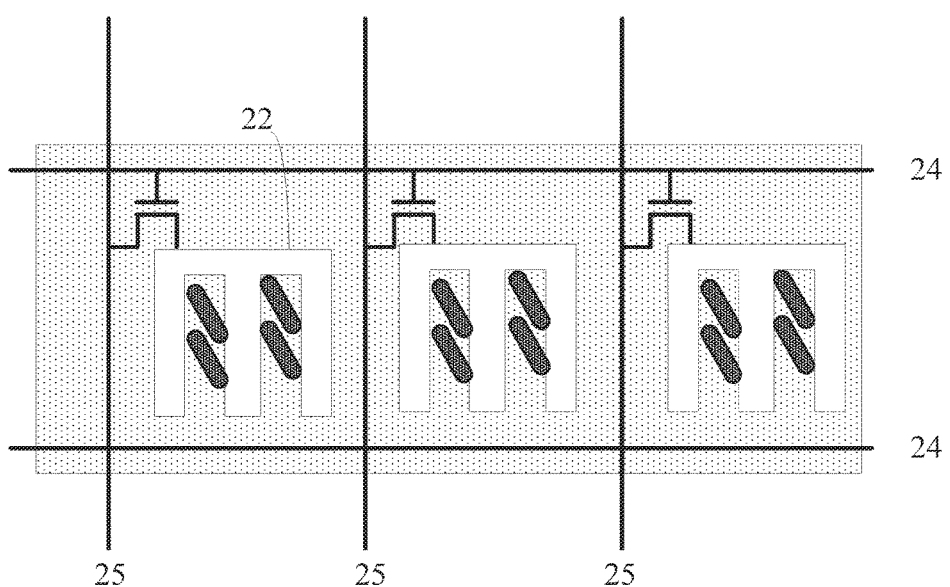
FIG. 1 illustrates an existing in-plane electric field driving type liquid crystal display device.
Figure 2:
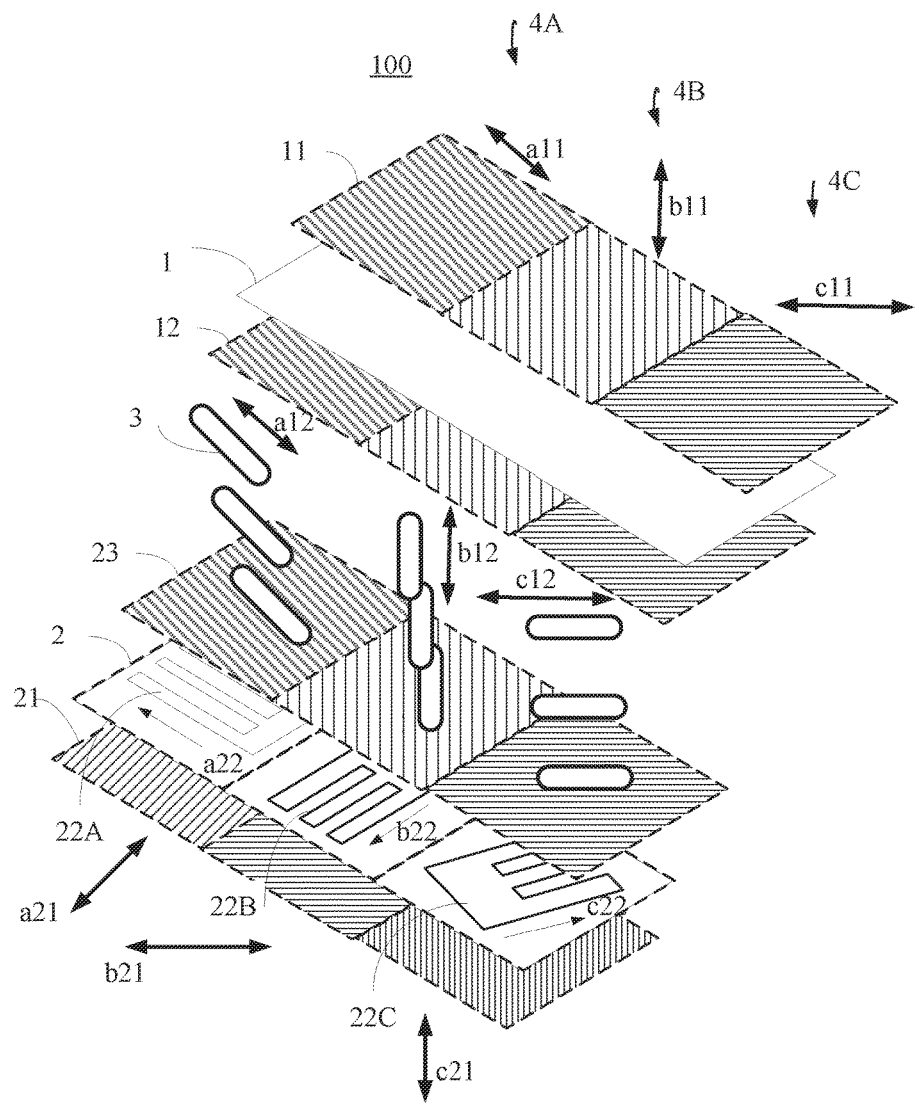
FIG. 2 illustrates an exemplary liquid crystal display panel consistent with the disclosed embodiments.

FIG. 2 illustrates an exemplary liquid crystal display panel 100. As shown in FIG. 2, the liquid crystal display panel 100 includes a first substrate 1, a second substrate 2 arranged opposite to the first substrate 1, and a liquid crystal layer 3 sandwiched between the first substrate 1 and the second substrate 2.

The liquid crystal display panel 100 includes a plurality of regions arranged in a matrix form. A region group comprises n regions, where n≥3. FIG. 2 shows three regions: region 4A, region 4B and region 4C, and these three regions form a region group.

A first alignment layer 12 is disposed between the first substrate 1 and the liquid crystal layer 3. The first alignment layer 12 comprises an optical-alignment material, and the first alignment layer 12 has a first alignment direction. In a region group, the first alignment direction of each of the n regions may be different. As shown in FIG. 2, the first alignment layer 12 at the region 4A has a first alignment direction a12; the first alignment layer 12 at the region 4B has a first alignment direction b12; and the first alignment layer 12 at the region 4C has a first alignment direction c12. The first alignment direction a12, the first alignment direction b12, and the first alignment direction c12 may be different from one another.

In the liquid crystal display panel 100, the initial alignment direction of the liquid crystal molecules of the liquid crystal layer 3 at a region is the same as the first alignment direction of that region. The initial alignment direction of a liquid crystal molecule refers the alignment direction of the liquid crystal molecule in the liquid crystal layer 3 in the absence of an electric field. Because the first alignment layer 12 has the ability of riveting liquid crystal molecules, in the absence of an electric field, liquid crystal molecules are aligned along the first alignment direction of the first alignment layer.

Further, multiple stripe-shaped electrodes may be disposed on the second substrate 2, with each region comprising at least one stripe-shaped electrode. A stripe-shaped electrode has an orientation direction. In a region group, the orientation directions of the stripe-shaped electrodes in the n regions may be different. As shown in FIG. 2, the region 4A includes a stripe-shaped electrode 22A, the region 4B includes a stripe-shaped electrode 22B, and the region 4C includes a stripe-shaped electrode 22. The orientation direction of the stripe-shaped electrode 22A is a22, the orientation direction of the stripe-shaped electrode 22B is b22, and the orientation direction of the stripe-shaped electrode 22C is c22. The orientation directions of a22, b22, and c22 may be different from one another.

Further, a second alignment layer 23 may be disposed between the liquid crystal layer 3 and the multiple stripe-shaped electrodes. The second alignment layer 23 may have a second alignment direction, and the second alignment direction of the second alignment layer 23 may be the same as the first alignment direction of the first alignment layer 12. In a region group, the second alignment directions at the n regions may also be different from one another.

Figure 3A:
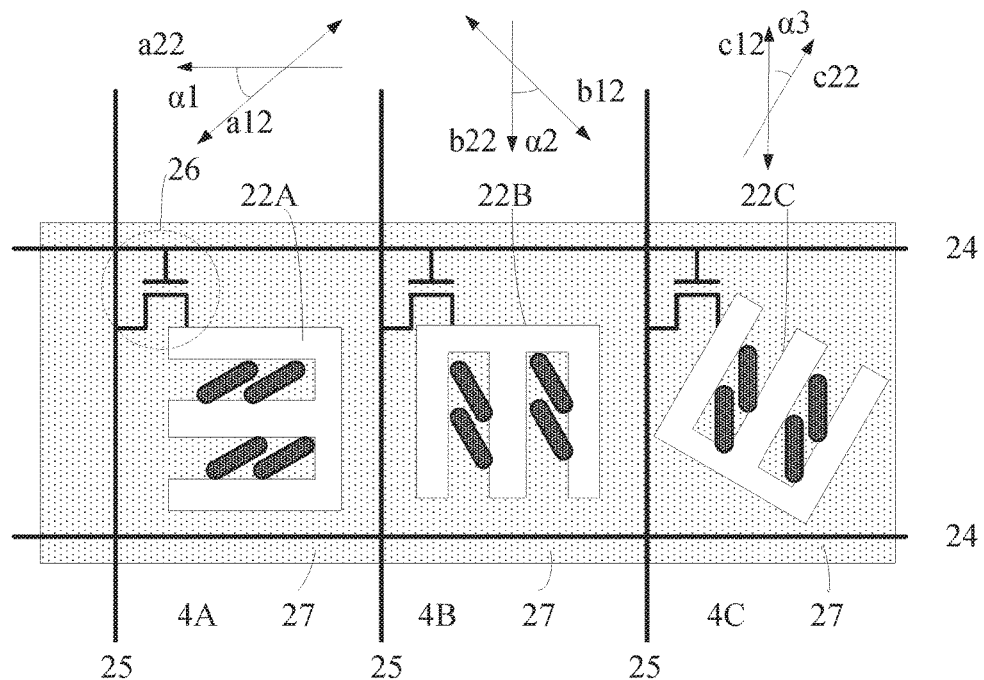
FIG. 3A illustrates exemplary relationships between stripe-shaped electrodes and first alignment directions.

The orientation direction of a stripe-shaped electrode may be at an angle with the first alignment direction. In a region group, the orientation direction of the stripe-shaped electrode in each region may have a same angle with respect to the first alignment direction. FIG. 2 and FIG. 3a illustrate such relationship. As shown in FIG. 3a, the angle between the stripe-shaped electrode 22A and the first alignment direction a12 is α1, the angle between the stripe-shaped electrode 22B and the first alignment direction b12 is α2, the angle between the stripe-shaped electrode 22C and the first alignment direction c12 is α3, and values of α1, α2, and α3 may be the same.

Further, the liquid crystal display panel 100 further includes multiple scan lines 24 and multiple data lines 25. The multiple scan lines 24 may be insulated from and intersecting with the multiple data lines 25, and the intersection between the scan lines 24 and data lines 25 may define a plurality of regions. For example, as shown in FIG. 3a, the regions defined by the intersections of the multiple scan lines 24 and the multiple data lines 25 include region 4A, region 4B, and region 4C. Each region may be a pixel unit, and each region may include a thin film transistor (TFT) switching element, a pixel electrode, and a common electrode, etc.

The pixel electrode may be a stripe-shaped electrode, and the common electrode may be a planar electrode. The pixel electrode may be located above the common electrode, and there is an insulating layer between the pixel electrode and the common electrode. As shown in FIG. 3a, the region 4A includes a thin film transistor switching element 26, a pixel electrode 22A, and a common electrode 27; the region 4B includes a thin film transistor switching element 26, a pixel electrode 22B, and a common electrode 27; and the region 4C includes a thin film transistor switching element 26, a pixel electrode 22C, and a common electrode 27. There is an insulating layer (not shown) between the pixel electrodes 22A, 22B, 22C and the common electrode 27. The common electrodes 27 in multiple regions may be connected together.

Further, within the region 4A, there is an angle α1 between the orientation direction a22 of the pixel electrode 22A and the first alignment direction a12; in the region 4B, there is an angle α2 between the orientation direction b22 of the pixel electrode 22B and the first alignment direction b12; and in the region 4C, there is an angle α3 between the orientation direction c22 of the pixel electrode 22C and the first alignment direction c12. The angle α1, the angle α2 and the angle α3 may be equal.

Further, in the n regions of a region group, because the angles between the orientation directions of the pixel electrodes and the first alignment directions are equal, the angles between the initial alignment directions of the liquid crystal molecules and the orientation directions of the pixel electrodes are also equal. When a same driving voltage is applied between the pixel electrodes and the common electrodes at the n regions, the rotation angles of the liquid crystal molecules are equal and, thus, the grayscales at the n regions are the same.

Figure 3B:
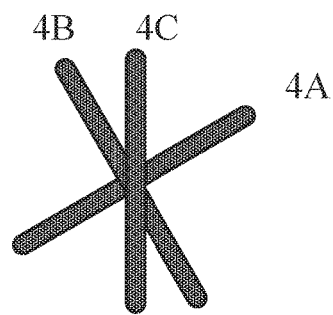
FIG. 3B illustrates initial alignment directions of the liquid crystal molecules in the three regions shown in FIG. 3A.

As shown in FIG. 3b, the initial alignment directions of the liquid crystal molecules in the regions 4A, 4B, and 4C are different. When different display regions displays a same or similar gray scale, the optical effects of the liquid crystal molecules in different region may compensate each other, and the visual effects viewed from different directions tend to be consistent. The more the number of regions in a region group, i.e., the larger the value of n, the better the optical compensation effects of the regions in a region group. In one embodiment, n is larger than or equal to 3.

Both the first alignment layer 12 and the second alignment layer 23 may include a photo-alignment material. Under the irradiation of polarized ultraviolet light, the photo-alignment material may form a certain alignment direction. If the different regions of the first alignment layer 12 are irradiated with polarized ultraviolet light with different polarization directions, the different regions may have different first alignment directions. Similarly, if the different regions of the second alignment layer 12 are irradiated with polarized ultraviolet light with different polarization directions, the different regions may have different second alignment directions.

The angle between the orientation direction of a stripe-shaped electrode and a first alignment direction is a pre-tilt angle of a liquid crystal molecule. The pre-tilt angle makes a liquid crystal molecule rotates, under the effect of an electric field, in a predetermined direction. The pre-tilt angle may be in the range from 0° to 15°.

Returning to FIG. 2, the liquid crystal display panel 100 may further includes a first organic film layer 11 and a second organic film layer 21. The first organic film layer 11 may be disposed on the far side of the first alignment layer 12 away from the liquid crystal layer 3, and the first organic film layer 11 has a first polarization direction. The second organic film layer 21 may be disposed on the far side of the second alignment layer 23 away from the liquid crystal layer 3, and the second organic film layer 21 has a second polarization direction. Both the first organic film layer 11 and the second organic film layer 21 may include a base material and a dichroic organic dye. The first polarization direction of the first organic film layer 11 and the second polarization direction of the second organic film layer 21 may be perpendicular to each other.

A liquid crystal molecule has a light modulation or light rotation function. To display an image, a liquid crystal display panel needs to have a pair of polarization layers whose polarization directions are perpendicular to each other. The polarization direction of one of the pair of polarizing layers is perpendicular to the initial alignment direction of the liquid crystal molecules (i.e., the first alignment direction), and the polarization direction of the other polarization layer is parallel to the initial alignment direction of liquid crystal molecules (i.e., the first alignment direction).

Because the first alignment directions of the n regions in a region group are different, the first polarization directions of the n regions are different, and the second polarization directions of the n region are also different. The first organic film layer 21 and the second organic film layer 21 may act as a pair of polarization layers. As shown in FIG. 2, the first organic film layer 11 at the region 4A has a first polarization direction a11; the first organic film layer 11 at the region 4B has a first polarization direction b11; and the first organic film layer 11 at the region 4C has a first the polarization direction of c11. The first polarization direction a11, the first polarization direction b11, and the first polarization direction c11 are different.

Further, the second organic film layer 2l at the region 4A has a second polarization direction a21; the second organic film layer 21 at the region 4B has a second polarization direction b21; and the second organic film layer 21 at the region 4C has a second polarization direction c21. The second polarization direction a21, the second polarization direction b21, and the second polarization direction c21 are also different. However, the second polarization direction a21 is perpendicular to the first polarization direction a11; the second polarization direction b21 is perpendicular to the first polarization direction b11; and the second polarization direction c21 is perpendicular to the first polarization direction c11.

The first polarization directions a11, b11, and c11 of the first organic film layer 11 at regions 4A, 4B, and 4C are parallel to the first alignment directions a12, b12, c12, respectively. The second polarization directions a12, b12, c12 of the second organic film layer 21 at regions 4A, 4B, and 4C are perpendicular to the first alignment direction a12, b12, c12, respectively.

In some other embodiments, the second polarization directions of the second organic film layer may be parallel to the first alignment directions, and the first polarization directions of the first organic film layer are perpendicular to the first alignment directions. Other configurations may also be used as long as the polarization directions of one of two organic film layers are perpendicular to the first alignment directions, and the polarization directions of the other organic film layer is parallel to the first alignment directions.

Both the first organic film layer 11 and the second organic film layer 21 may include a base material and a dichroic organic dye. The base material of the first organic film layer 11 and the second organic film layer 21 may be an optical-alignment material or a non-optical-alignment material, and the dichroic organic dye may be an optical-alignment material or a non-optical-alignment material. However, at least one of the base material and the dichroic organic dye is an optical-alignment material when the first organic film layer 11 and the second organic film layer 21 are formed.

For example, in one embodiment, the base material is an optical-alignment material, and the dichroic organic dye material is a non-optical-alignment material. Under the irradiation of polarized ultraviolet light, the molecules of the base materials may be aligned along a certain direction. The aligned base material then makes the dichroic organic dye to align along the same direction. When the dichroic organic dye is aligned along a certain direction, the organic film layer has a certain polarization. Irradiating the different regions of the first organic film layer 11 and the second organic film layer 21 with polarized ultraviolet light with different polarization directions may make the first organic film layer 11 and the second organic film layer 21 have different polarization directions in different regions.

In another embodiment, the dichroic organic dye is an optical-alignment material, and the base material is a non-optical-alignment material. Under the irradiation of polarized ultraviolet light, the dichroic organic dye molecules may be arranged along a direction and thus have a certain degree of polarization, and the base material may provide a better film-forming function. In certain other embodiments, both the dichroic organic dye and the base material are optical-alignment materials.

The dichroic organic dye may include one or more of azo dye, anthraquinone dye, biphenyl dye, triphenylmethane dye, diazinon and derivative, single methine or methine dye, polyethylene ring dichroic dye, and other organic dyes.

Figure 4A:
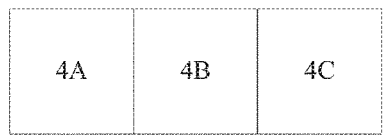
FIGS. 4A-4C illustrate three exemplary alignment ways of the n regions in a region group consistent with the disclosed embodiments.
Figure 4B:
Figure 4C:
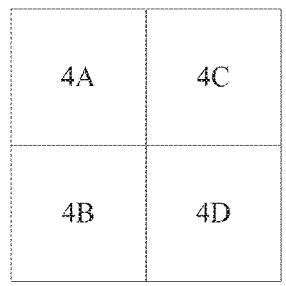

The n regions of a region group may be aligned in a row. As shown in FIG. 4a, the region 4A, the region 4B and the region 4C are aligned in a row. The n regions of a region group may also be aligned in a column. As shown in FIG. 4b, the region 4A, the region 4B and the region 4C are aligned in a column. Further, the n regions in a region group may also be aligned in multiple rows and multiple columns, e.g., an array. As shown in FIG. 4c, the region 4A, the region 4B, the region 4C and the region 4D are aligned in two rows and two columns, e.g., a 2×2 array.

Further, in the n regions of a region group, the angle between the first alignment directions of two adjacent regions is 90°/n. That is, the angle between the initial alignment directions of the liquid crystal molecules in two adjacent regions is 90°/n. The angle between the long axis and the short axis of a liquid crystal molecule is 90°, and a liquid crystal molecule has a maximum difference in the optical properties between the long axis and the short axis. By setting n regions in the range of 90° for the mutual compensation of the optical properties of liquid crystal molecules, the display uniformity may be significantly improved.

Alternatively, at the n regions of a region group, the angle between the first alignment directions of two adjacent regions is 180°/n. That is, the angle between the initial alignment directions of the liquid crystal molecules in two adjacent regions is 180°/n. Excellent optical compensation effects may also be obtained.

Alternatively, the n regions comprise at least a pair of regions, and the angle between the first alignment directions of this pair of regions is 90°. The angle between the long axis and the short axis of a liquid crystal molecule is 90°, and a liquid crystal molecule has a maximum difference in the optical properties between the long axis and the short axis. By setting a pair of regions, whose first alignment directions form an angle of 90°, the optical properties in the long axis and the optical properties in the short axis can compensate each other, and the color shift may be reduced or eliminated.

Figure 5:
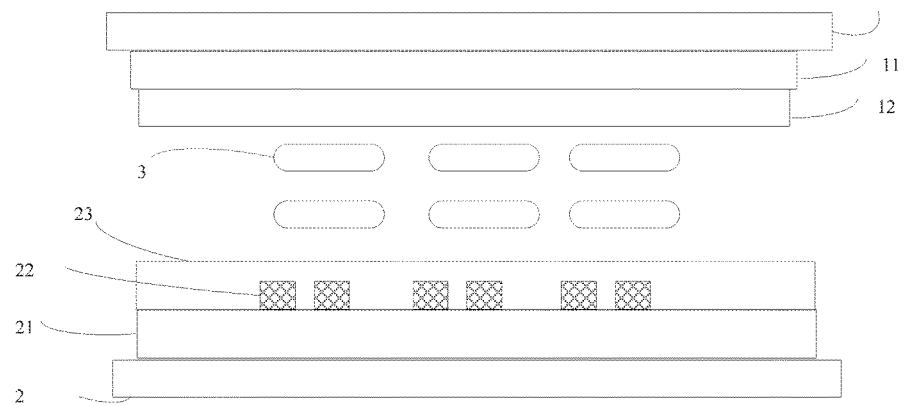
FIG. 5 illustrates exemplary locations of a first organic film layer and a second organic film layer consistent with the disclosed embodiments.

In certain embodiments, as shown in FIG. 2, the first organic film layer 11 is located at the far side of the first substrate 1 away from the liquid crystal layer 3, and the second organic film layer 21 is located at the far side of the second substrate 2 away from the liquid crystal layer 3. In some other embodiments, as shown FIG. 5, the first organic film layer 11 may be located between the first alignment layer 12 and the first substrate 1, and the second organic film layer 21 may be located between the second alignment layer 23 and the second substrate 2. Other configurations may also be used.

Figure 6:
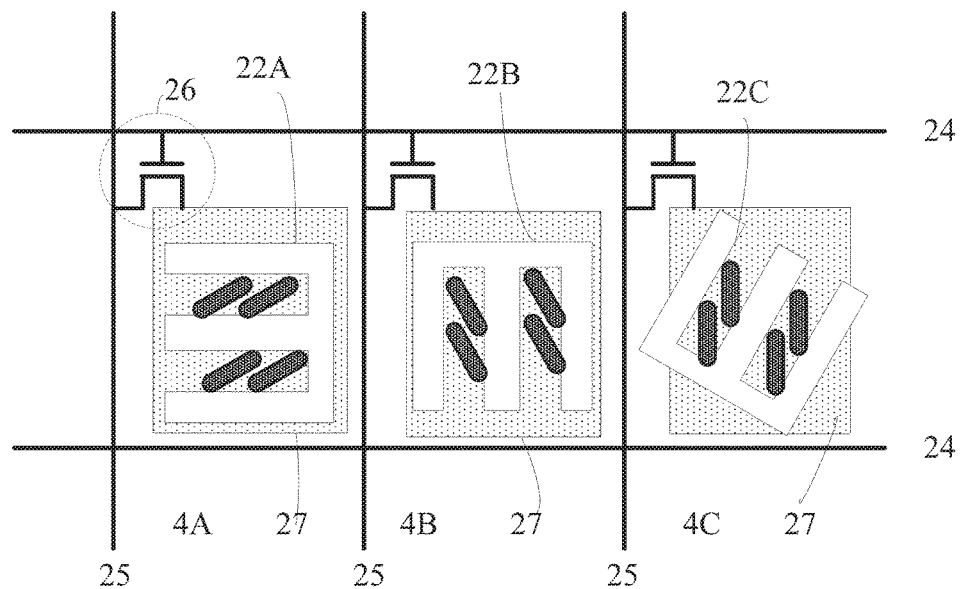
FIG. 6 illustrates exemplary stripe-shaped electrodes consistent with the disclosed embodiments.

In some embodiments, as shown in FIG. 3A, the pixel electrode is a stripe-shaped electrode. In some other embodiments, the common electrode may also be a stripe-shaped electrode. FIG. 6 shows an exemplary liquid crystal display panel.

As shown in FIG. 6, a liquid crystal display panel includes intersecting and insulated multiple scan lines 24 and multiple data lines 25. The intersections of the multiple scan lines 24 and the multiple data lines 25 define a plurality of regions, including region 4A, region 4B and region 4C. The region 4A, the region 4B and the region 4C form a region group. Each region is a pixel unit, and each pixel unit includes a thin film transistor switching element 26, a pixel electrode 27 and a common electrode. The pixel electrode may be a planar electrode, and the common electrode may be a stripe-shaped electrode. The pixel electrode is located below the common electrode, and there is an insulating layer between the pixel electrode and the common electrode.

As shown in FIG. 6, the region 4A comprises a thin film transistor switching element 26, a pixel electrode 27, and a common electrode 22A; the region 4B comprises a thin film transistor switching element 26, a pixel electrode 27, and a common electrode 22B; and the region 4C comprises a thin film transistor switching element 26, a pixel electrode 27, and a common electrode 22C. All the pixel electrodes 27 are planar electrodes, and all the common electrodes 22A, 22B, 22C are stripe-shaped electrodes. In some other embodiments, both the pixel electrodes and the common electrodes may be stripe-shaped electrodes.

In some embodiments, as shown in FIG. 3A, a liquid crystal display panel comprises intersecting and insulated multiple scan lines 24 and multiple data lines 25. The multiple scan lines 24 and the multiple data lines 25 intersect, defining a plurality of regions. Each region is a pixel unit.

In some other embodiments, multiple scan lines and multiple data lines intersect, defining multiple region groups, and one region group is a pixel unit. In each region group, the stripe-shaped electrodes in the n regions are connected together.

Figure 7A:
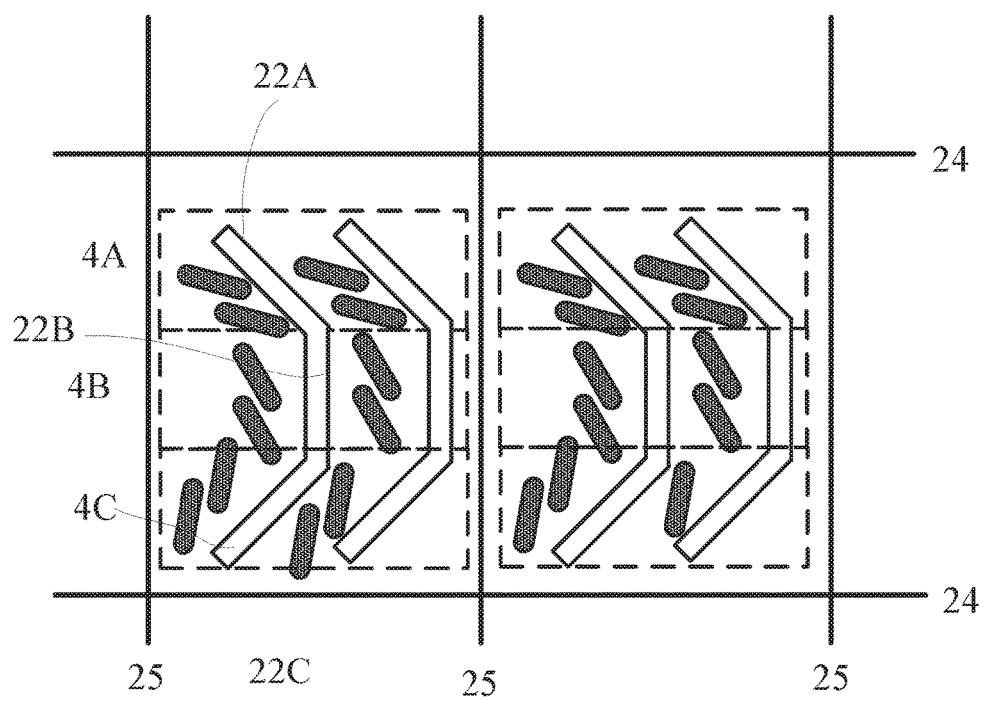
FIG. 7A illustrates exemplary multiple region groups consistent with the disclosed embodiments.

As shown in FIG. 7a, the liquid crystal display panel comprises intersecting and insulated multiple scan lines 24 and multiple data lines 25. The multiple scan lines and multiple data lines intersect, defining multiple region groups, and one region group is a pixel unit. In each region group, the stripe-shaped electrodes in the n regions are connected together. In FIG. 7a, n is 3, and the three regions in a region group are region 4A, region 4B, and region 4C, respectively, and are arranged in a column configuration. The region 4A comprises a stripe-shaped electrode 22A; the region 4B comprises a stripe-shaped electrode 22B; and the region 4C comprises a stripe-shaped electrode 22C. The stripe-shaped electrode 22A in the region 4A, the stripe-shaped electrode 22B in the region 4B, and the stripe-shaped electrode 22C in the region 4C are sequentially connected together.

Figure 7B:
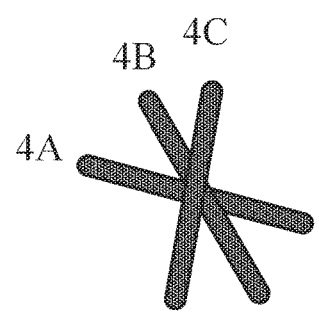
FIG. 7B illustrates the initial alignment directions of liquid crystal molecules in the three regions shown in FIG. 7A.

FIG. 7b illustrates the initial alignment directions of the liquid crystal molecules in the three regions 4A, 4B and 4C, shown in FIG. 7a. FIG. 7b shows that the initial arrangement directions of the liquid crystal molecules in different regions are different. Therefore the optical effects of the liquid crystal molecules in different regions may compensate each other. Therefore, when the liquid crystal display panel is viewed in different directions, the visual effects tend to be consistent.

The present disclosure also provides a liquid crystal display device comprising any of the above disclosed liquid crystal display panels. In the liquid crystal display panels and liquid crystal display devices according to the present disclosure, the liquid crystal molecules in different regions may compensate the optical properties each other, so as to reduce color shift and improve viewing effect when the liquid crystal display panels or liquid crystal display devices are viewed at different angles.

Figure 15:
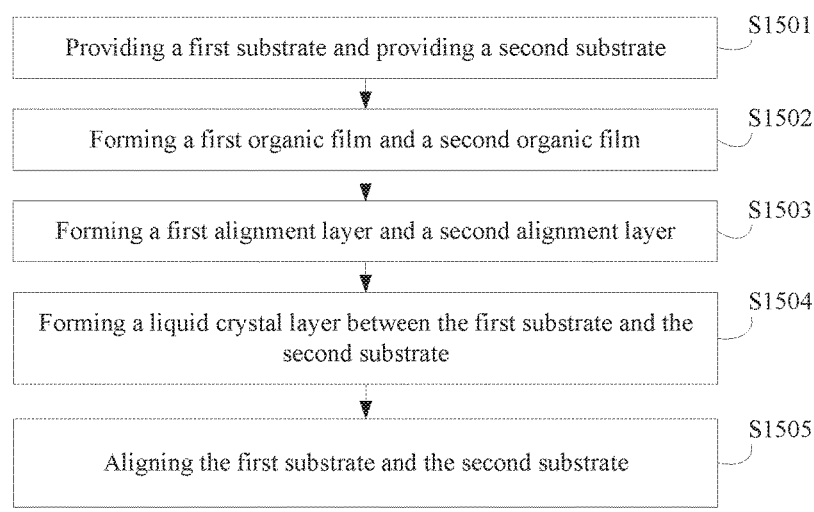
FIG. 15 illustrates an exemplary fabrication process consistent with the disclosed embodiments.

The present disclosure also provides a fabrication process of the disclosed liquid crystal display panels. FIG. 15 illustrates an exemplary fabrication process of a liquid crystal display panel. FIGS. 8a-11B show corresponding structures of certain stages of the fabrication process. As shown in FIG. 15, the fabrication process may include following steps.

Figure 8A:
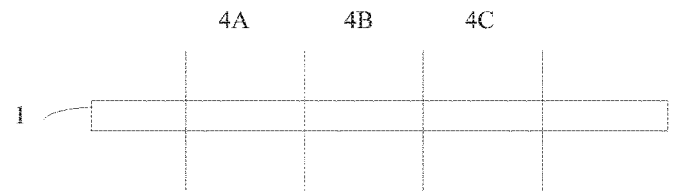
FIGS. 8A-11B illustrate a liquid crystal display panel in different steps of an exemplary fabrication procedure consistent with the disclosed embodiments.
Figure 8B:
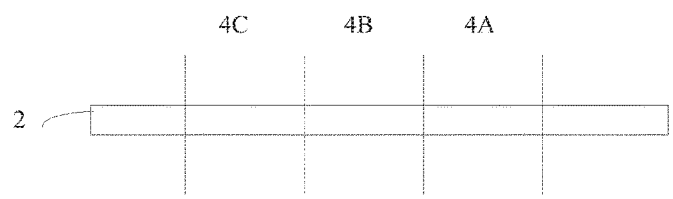

Step S1501: providing a first substrate and providing a second substrate. The first substrate has multiple regions arranged in a matrix form, and in the multiple regions, n regions form a region group, where n≥3. The second substrate has multiple regions arranged in a matrix form, and in the multiple regions, n regions form a region group, where n≥3. The sequence of providing the first substrate and providing the second substrate is not limited. FIGS. 8a and 8b show corresponding structures.

As shown FIG. 8a, the first substrate has multiple regions arranged in a matrix form, wherein the n regions form a first region group. The three regions include region 41A, region 41B and region 41C, and these three regions form a region group.

As shown FIG. 8B, the second substrate has multiple regions arranged in a matrix form, wherein the n regions form a region group. The three regions include region 42A, region 42B and region 42C, and these three regions form a region group.

Figure 9A:
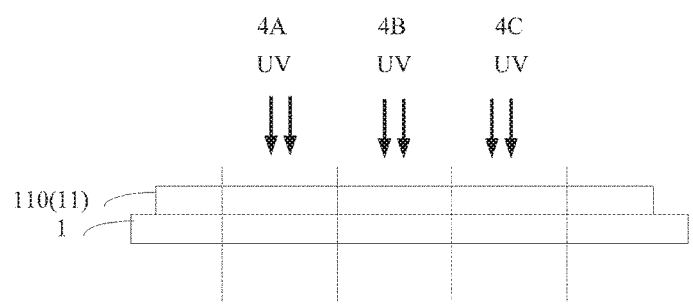
Figure 9B:
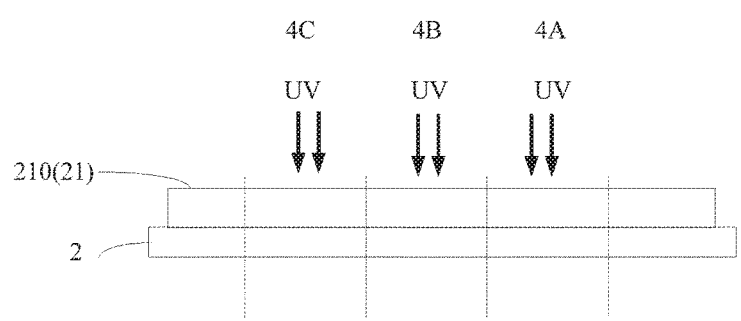

Step S1502: forming a first organic film and a second organic film. Specifically, a first organic material layer is first formed on the first substrate, and the first organic material layer is irradiated with polarized ultraviolet light so as to form the first organic film layer. A second organic material layer is formed on the second substrate, and the second organic material layer is irradiated with polarized ultraviolet light so as to form the second organic film layer. It should be noted that the formation sequence of the first organic film layer and the second organic film layer is not limited. FIG. 9a and FIG. 9b show the corresponding structures.

As shown in FIG. 9A, a first organic material layer 110 is formed on the first substrate 1, and the first organic material layer 110 comprises a substrate and a dichroic organic dye. The organic material layer 110 is irradiated by polarized ultraviolet light to form a first organic film layer 11. The first organic film layer is polarized, and a polarization direction of the first organic film layer is called a first polarization direction. In a region group comprising n regions, the first polarization directions of the first organic film layers 11 at the n regions are different. Specifically, the first polarization direction at the region 4A, the first polarization direction at the region 4B, and the first polarization direction at the region 4C are different.

As shown in FIG. 9B, a second organic material layer 210 is formed on the second substrate 2, and the second organic material layer 210 comprises a base material and a dichroic organic dye. The second organic material layer 210 is irradiated by polarized ultraviolet light to form a second organic film layer 21. The second organic film layer is polarized, and a polarization direction of the second organic film layer is called a second polarization direction. In a region group comprising n regions, the second polarization directions of the second organic film layers at the n regions are different. Specially, the second polarization direction at the region 4A, the second polarization direction at the region 4B, and the second polarization direction at the region 4C are different.

In a region, the first polarization direction and the second polarization direction are perpendicular to each other. Specifically, in the region 4A, the first region direction is perpendicular to the second polarization direction; in the region 4B, the first region direction is perpendicular to the second polarization direction, and in the region 4C, the first region direction is perpendicular to the second polarization direction.

Step S1503: forming a first alignment layer and a second alignment layer. Specifically, a first alignment material layer is formed on the first substrate, and the first alignment material layer is irradiated with polarized ultraviolet light to form the first alignment layer. The first alignment layer has a first alignment direction, and the first direction of each region in a region group may be different.

Further, a plurality of stripe-shaped electrodes are formed on the second substrate; and a second alignment material layer is formed on the multiple stripe-shaped electrodes. Each region comprises at least one stripe-shaped electrode. A stripe-shaped electrode has an orientation direction. In a region group, the configuration directions of the stripe-shaped electrodes at the n region are different. The second alignment material layer includes an optical-alignment material, and the second alignment material layer is irradiated with polarized ultraviolet light to form the second alignment layer. The second alignment layer has a second alignment direction, and the second direction of each region in a region group may be different. In a region, the first alignment direction and the second orientation are in the same direction. The formation sequence of the first alignment layer and the second alignment layer is not limited.

Figure 10A:
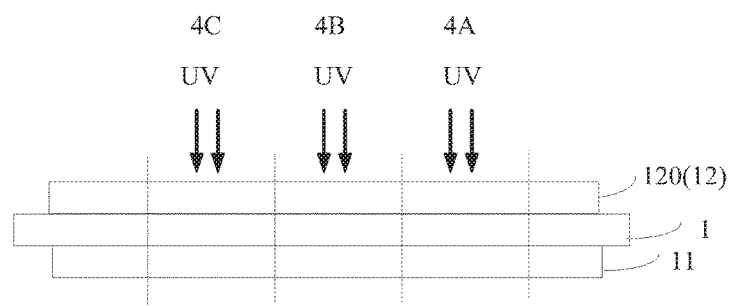

As shown in FIG. 10a, a first alignment material layer 120 is formed on the first substrate 1, and the first alignment material includes an optical-alignment material. The first alignment material layer 120 is irradiated with polarized ultraviolet light to form the first alignment layer 12. The first alignment layer 12 has a first alignment direction. In a region group, the first alignment directions in the n region are different. Specifically, the first alignment direction of the region 4A, the first alignment direction of the region 4B, and the first alignment direction of the region 4C are different.

Figure 10B:
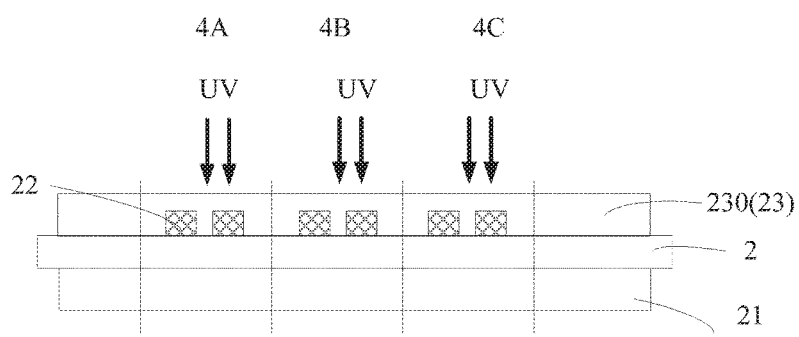

As shown in FIG. 10b, multiple stripe-shaped electrodes 22 are formed on the second substrate 2. A region comprises at least one stripe-shaped electrode 22, and the stripe-shaped electrode 22 has an orientation direction. In a region group, the orientation directions of the stripe-shaped electrodes 22 in three regions are different.

A second alignment material layer 230 is formed on the multiple stripe-shaped electrodes 22, and the second alignment layer 230 comprises an optical-alignment material. The second alignment material layer 230 is irradiated by polarized ultraviolet light to form a second alignment layer 23. The second alignment layer 23 has a second alignment direction. In a region group, the second alignment directions of the three different regions are different. Specifically, the second alignment direction of the region 4A, the second alignment direction of the region 4B, and the second alignment direction of the region 4C are different.

In a region, the first alignment direction and the second orientation are in the same direction. Specifically, in the region 4A, the first alignment direction and the second alignment direction are in the same direction; in the region 4B, the first alignment direction and the second alignment direction are in the same direction; and in the region 4C, the first alignment direction and the second alignment direction are in the same direction.

In the above embodiment, the first alignment layer 12 and the first organic film layer 11 are formed on the two different sides of the first substrate 1, and the sequence of forming the first alignment layer 12 and forming the first organic film layer 11 is not limited. The second alignment layer 23 and the second organic film layer 21 are formed on the two different sides of the second substrate 2, the sequence of forming the second alignment layer 23 and forming the second organic film layer 21 is not limited.

Step S1504: forming a liquid crystal layer at the side of the first substrate where the first alignment layer is formed, or forming a liquid crystal layer at the side of the second substrate where the second alignment layer is formed.

Step S1505: aligning the first substrate and the second substrate, with the side of the first substrate having the first alignment layer facing toward the side of the second substrate having the second alignment layer, and bonding the first substrate and the second substrate.

Figure 11A:
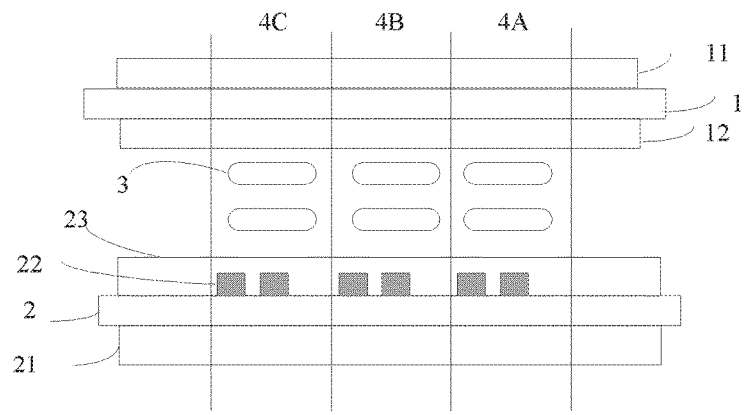
Figure 11B:
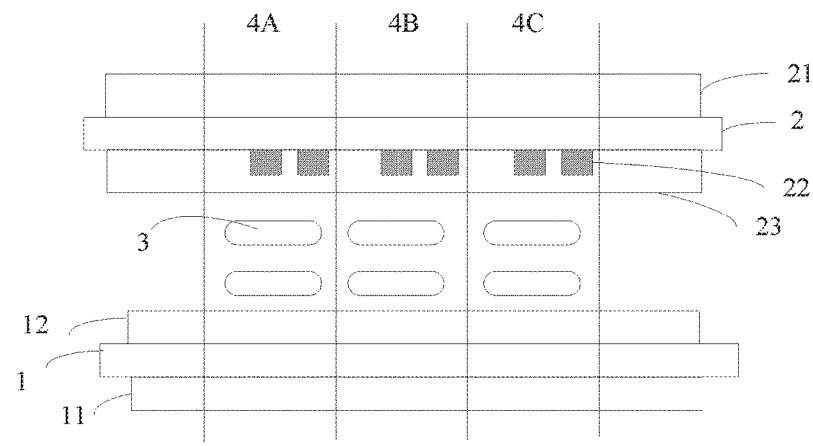

FIGS. 11a-11b show corresponding structures with respect to Step S1504 and Step S1505. As shown in FIG. 11a, a liquid crystal layer 3 is formed on the side of the second substrate 2 where the second alignment layer 23 is formed. The side of the first substrate where the first alignment layer is formed and the side of the second substrate where the second alignment layer is formed are placed facing with each other, and the first substrate and the second substrate are then aligned and bonded.

As shown in FIG. 11b, a liquid crystal layer 3 is formed on the side of the first substrate 1 where the first alignment layer 12 is formed. The side of the second substrate where the second alignment layer is formed and the side of the first substrate where the first alignment layer is forming are placed facing with each other, and the first substrate and the second substrate are then aligned and bonded.

As shown in FIG. 2, in the liquid crystal display panel formed after bonding, there is an angle between the orientation direction of the stripe-shaped electrodes and the first alignment direction. In a region group, the angles between the orientation directions of the stripe-shaped electrodes and the first direction of orientations are equal.

Figure 12A:
FIG. 12A illustrates the formation of a first alignment layer and a first organic film layer on a same side of a first substrate consistent with the disclosed embodiments.
Figure 12B:
FIG. 12B illustrates the formation of a second alignment layer and a second organic film layer on a same side of a second substrate consistent with the disclosed embodiments.

In certain other embodiments, the first alignment layer and the first organic film layer may be formed on the same side of a first substrate, and the second alignment layer and the second organic film layer may be formed on the same side of the second substrate. FIG. 12a and FIG. 12b show the corresponding structures.

As shown in FIG. 12a, a first substrate 1 is provided, and a first organic film layer 11 is formed on the first substrate 1. A first alignment layer 12 is then formed on the first organic film layer 11. As shown in FIG. 12b, a second substrate 2 is provided, and a second organic film layer 21 is formed on the second substrate 2. A second alignment layer 23 is then formed on the second organic film layer 21. After the first substrate 1 and second substrate 2 are bonded, the first alignment layer 12 is closer to the liquid crystal layer 3 than the first organic film layer 11, and thus the first alignment layer 12 determines the initial arrangement direction of the liquid crystal molecules; the second alignment layer 23 is closer to the liquid crystal layer 3 than the second organic film layer 21, and thus the second alignment layer 23 determines the initial arrangement direction of the liquid crystal molecules. The first alignment direction of the first alignment layer and the second alignment direction of the second alignment layer are in the same direction.

Specifically, the method of irradiating the first organic material layer with polarized ultraviolet light to form a first polarized organic film layer comprises: providing n masks, wherein the $m^{th}$ mask correspondingly exposes the $m^{th}$ region of the first organic material layer, and blocks other regions; irradiating the $m^{th}$ region of the first organic material layer with polarized ultraviolet light through the $m^{th}$ mask, where $1 \leq m \leq n$. The polarization directions of the polarized ultraviolet light received by the n regions are different.

Figure 13A:
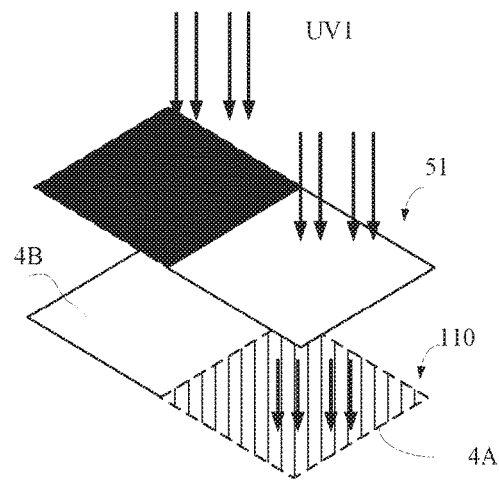
FIGS. 13A-13C illustrate an exemplary method of irradiating a first organic material layer with polarized ultraviolet light to form a first organic film layer, consistent with the disclosed embodiments.

As shown in FIG. 13a, when m is equal to 1, a first mask 51 correspondingly exposes the first region 4A of the first organic material layer 110, and blocks all other regions of the first organic material layer 110. The first organic material layer 110 is irradiated with polarized ultraviolet light UV1 passing through the first mask 51. Because the blocking of the first mask 51, only the first region 4A of the first organic material layer 110 receives the irradiation of the polarized ultraviolet light UV1.

The first organic material layer 110 comprises a base material and a dichroic organic dye. The base material may be an optical-alignment material or a non-optical-alignment material, and the dichroic organic dye may be an optical-alignment material or a non-optical-alignment material, as long as at least one of the base material and dichroic organic dye is an optical-alignment materials. For example, the base material is an optical-alignment material, and the dichroic organic dye is a non-directional light material. Under the irradiation of polarized ultraviolet light UV1, the molecules of the base material may get aligned along a certain direction, making the dichroic organic dye also aligned along the direction. When a dichroic organic dye is aligned along a certain direction, the dichroic organic dye has a certain degree of polarization. As another example, the dichroic organic dye is an optical-alignment material, and the base material is a non-optical-alignment material. Under the irradiation of polarized ultraviolet light, the dichroic organic dye molecules may be arranged along a certain direction and thus have a certain degree of polarization, and base material may provide a better film-forming function.

Figure 13B:
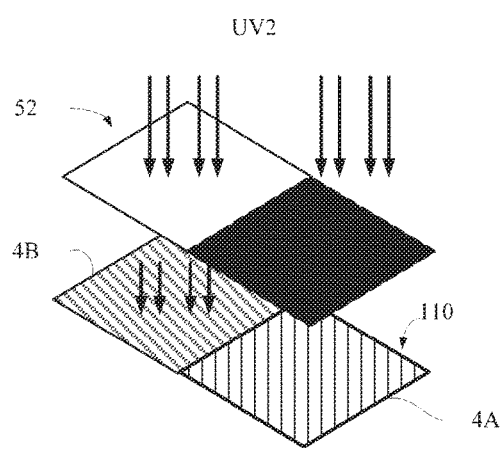

As shown in FIG. 13b, when m is equal to 2, a second mask 52 correspondingly exposes the second region 4B of the first organic material layer 110, and blocks other regions of the first organic material layer 110. The first organic material layer 110 is irradiated with polarized ultraviolet light UV2 through the second mask 52. Because the blocking of the second mask 52, only the second region 4B of the first organic material layer 110 receives the irradiation of the polarized ultraviolet light UV2. Thereby a first alignment direction is formed in the second region 4B. In a similar way, each of the regions from 3 to n is irradiated by polarized ultraviolet light with a corresponding mask, and a first alignment direction is formed in the corresponding region.

Figure 13C:
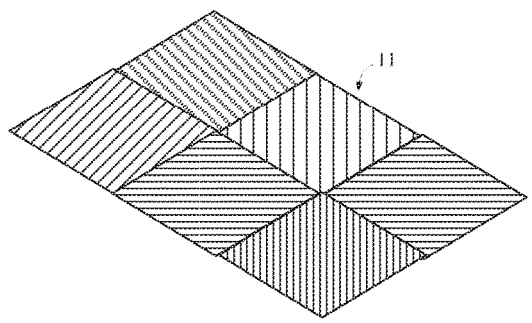

After completing the irradiations to the n regions of the first organic material layer 110 by polarized ultraviolet light with n masks are completed, wherein the polarized ultraviolet lights received by the n regions have polarization directions, the organic film layer 11 as shown in FIG. 13c may be obtained. The first polarization directions of the n regions of the organic film layer are different.

The method of irradiating the second organic material layer with polarized ultraviolet light to form the second organic film layer may be consistent with the method of forming the first organic film layer. Specifically, the method of irradiating the second organic material layer with polarized ultraviolet light to form the second organic film layer comprises: providing n masks, wherein the $m^{th}$ mask correspondingly expose the $m^{th}$ region of the second organic material layer and block the other regions of the second organic film layer; irradiating the $m^{th}$ region of the second organic material layer with polarized ultraviolet light through the $m^{th}$ mask, where $1 \leq m \leq n$; the polarization directions of the polarized ultraviolet light received by the n regions are different.

The method of irradiating the first alignment material layer with polarized ultraviolet light to form the first alignment layer includes: providing n masks, where the $m^{th}$ mask correspondingly expose the $m^{th}$ region of the first alignment material layer, and block the other regions of the first alignment film layer; irradiating the $m^{th}$ region of the first alignment material layer with polarized ultraviolet light through the $m^{th}$ mask, where $1 \leq m \leq n$; the polarization directions of the polarized ultraviolet light received by the n regions are different.

Figure 14A:
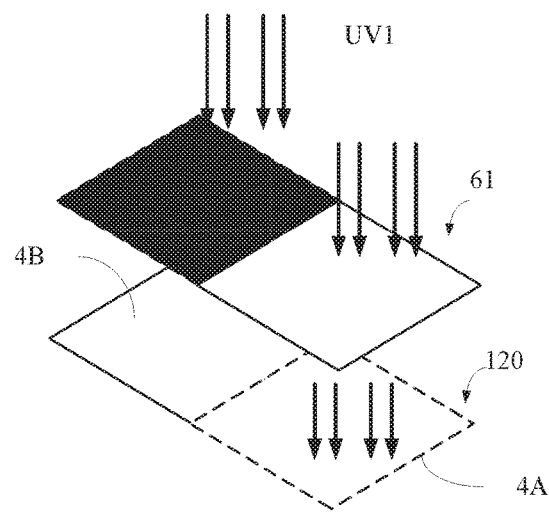
FIGS. 14A-14C illustrate an exemplary method of irradiating a first alignment material layer with polarized ultraviolet light to form a first alignment layer, consistent with the disclosed embodiments.

As shown in FIG. 14a, when m is equal to 1, a first mask 61 corresponding exposes a first region 4A of the first alignment material layer 120, and blocks all other regions of the first alignment material layer 120. The first alignment material layer 120 is irradiated with polarized ultraviolet light UV1 passing through the first mask 61. Because the blocking of the first mask 61, only the first region 4A of the first alignment material layer 120 receives the irradiation of the polarized ultraviolet light UV1. The first alignment material layer 110 comprises a base material and a dichroic organic dye. Because the first alignment material layer 120 is an optical-alignment material, under the irradiation of polarized ultraviolet UV1, the first alignment layer may have a first alignment direction.

Figure 14B:
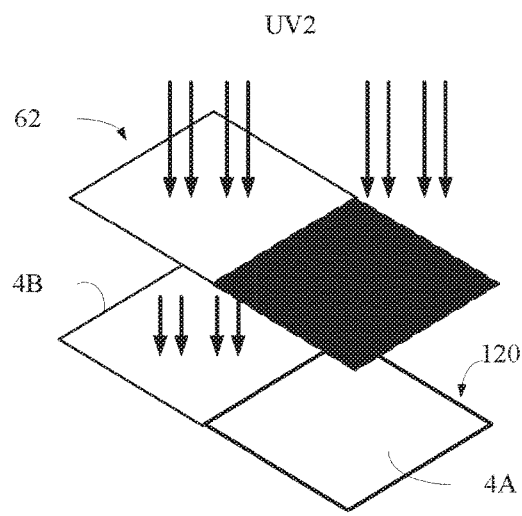

As shown in FIG. 14b, when m is equal to 2, a second mask 62 correspondingly exposes the second region 4B of the first alignment material layer 120, and blocks other regions of the first alignment material layer 120. The first alignment material layer 120 is irradiated with the polarized ultraviolet light UV2 passing through the second mask 62. Because of the blocking of the second mask 62, only the second region 4B of the first organic material layer 110 receives the irradiation of the polarized ultraviolet light UV2. Because the first alignment material layer 120 is an optical-alignment material, under the irradiation of polarized ultraviolet UV2, the first alignment layer may have a first alignment direction. In a similar way, each of the regions from 3 to n is irradiated by polarized ultraviolet light with a corresponding mask, and a first alignment direction is formed in each of the regions.

Figure 14C:
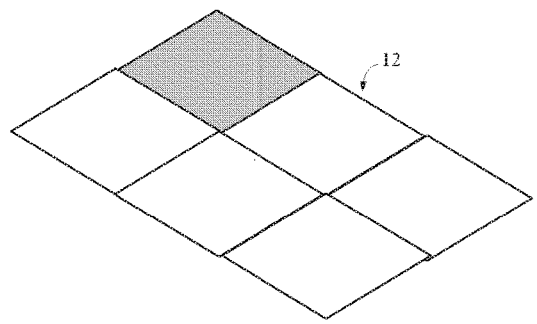

After completing the irradiations to the n regions of the first alignment material layer 120 by polarized ultraviolet light with n masks are completed, wherein the polarized ultraviolet lights received by the n regions have polarization directions, the organic film layer 12 as shown in FIG. 14c may be obtained. The first polarization directions of the n regions of the alignment layer of 12 are different.

The method of irradiating the second alignment material layer with polarized ultraviolet light to form the second alignment film layer is consistent with the method of forming the first alignment film layer. Specifically, the method of irradiating the second alignment material layer with polarized ultraviolet light to form the second alignment film layer comprises: providing n masks, where the $m^{th}$ mask correspondingly expose the $m^{th}$ region of the second alignment material layer and block the other regions of the second organic film layer; irradiating the $m^{th}$ region of the second alignment material layer with polarized ultraviolet light passing through the $m^{th}$ mask, where $1 \leq m \leq n$; the polarization directions of the polarized ultraviolet light received by the n regions are different.

It should be noted that, the technical solutions of the above embodiments may be used in combination, and the technical solutions for parts of the above embodiments may be also used in combination. The combinations of any of above embodiments and any parts of the above embodiments are within the scope of the present disclosure.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A liquid crystal display panel, comprising:
   a first substrate and a second substrate arranged opposite to the first substrate, wherein the display panel includes a plurality of regions arranged in an array, and n regions form a region group, n being an integer and $n \geq 3$;
   a liquid crystal layer disposed between the first substrate and the second substrate;
   a first alignment layer having a first alignment direction and disposed on the first substrate, the first alignment direction in each of the n regions being different;
   a second alignment layer having a second alignment direction and disposed on the second substrate, the second alignment direction in each of the n regions being different, wherein the second alignment direction is same as the first alignment direction in a same region;
   a first organic film layer having a first polarization direction and disposed on the first substrate, the first polarization direction in each of the n regions being different; and
   a second organic film layer having a second polarization direction and disposed on the second substrate, the second polarization direction in each of the n regions being different,
   wherein the first alignment directions of at least two regions of the n regions are perpendicular with each other.

2. The liquid crystal display panel according to claim 1, wherein:
   the first organic film layer is disposed on a far side of the first substrate away from the liquid crystal layer;
   the second organic film layer is disposed on a far side of the second substrate away from the liquid crystal layer; and
   the first polarization direction is perpendicular to the second polarization direction in a same region.

3. The liquid crystal display panel according to claim 2, further including:
   a plurality of stripe-shaped electrodes disposed between the second substrate and the second alignment layer, wherein each stripe-shaped electrode having an orientation direction; each region includes at least one stripe-shaped electrode; and the orientation direction of the stripe-shaped electrode in each of the n regions is different.

4. The liquid crystal display panel according to claim 3, wherein:
the orientation direction of the stripe-shaped electrode forms an angle with the first alignment direction;
within a region group, the angle between the orientation direction of the stripe-shaped electrode and the first alignment direction in each of the n regions is the same.

5. The liquid crystal display panel according to claim 4, wherein:
the angle between the orientation direction of the stripe-shaped electrode and the first alignment direction is in a range of 0 to 15 degrees.

6. The liquid crystal display panel according to claim 1, wherein:
an initial alignment direction of liquid crystal molecules in the liquid crystal layer is the same as the first alignment direction.

7. The liquid crystal display panel according to claim 1, wherein:
one of the first polarization direction and the second polarization direction is perpendicular to the first alignment direction, and the other one of the first polarization direction and the second polarization direction is parallel with the first alignment direction.

8. The liquid crystal display panel according to claim 1, wherein:
the first organic film layer is disposed between the first alignment layer and the first substrate, and the second organic film layer is disposed between the second alignment layer and the second substrate.

9. The liquid crystal display panel according to claim 3, wherein:
each region includes a pixel electrode and a common electrode, one of the pixel electrode and the common electrode is a planar electrode, and the other one of the pixel electrode and the common electrode is the stripe-shaped electrode.

10. The liquid crystal display panel according to claim 3, wherein:
each region includes a pixel electrode and a common electrode, both of the pixel electrode and the common electrode are the stripe-shaped electrodes.

11. The liquid crystal display panel according to claim 3, wherein:
each region is a pixel unit, and the stripe-shaped electrodes are connected together.

12. The liquid crystal display panel according to claim 1, wherein:
an angle difference between the first alignment directions of any two adjacent regions in the n regions is 90°/n or 180°/n.

13. The liquid crystal display panel according to claim 1, wherein:
both of the first organic film layer and the second organic film layer include a base material and a dichroic organic dye.

14. The liquid crystal display panel according to claim 13, wherein:
the dichroic organic dye includes one or more of azo dye, anthraquinone dye, biphenyl dye, triphenylmethane dye, diazinon and derivative, single methine or methine dye, polyethylene ring dichroic dye.

15. The liquid crystal display panel according to claim 1, wherein:
the first alignment layer and the second alignment layer include optical-alignment materials.

16. A method for fabricating a liquid crystal display panel, comprising:
providing a first substrate and a second substrate arranged opposite to the first substrate, wherein the display panel includes a plurality of regions arranged in an array, and n regions form a region group, n being an integer and $n \geq 3$;
forming a first alignment layer on the first substrate having a first alignment direction, the first alignment direction in each of the n regions being different, wherein the first alignment directions of at least two regions of the n regions are perpendicular with each other;
forming a second alignment layer on the second substrate having a second alignment direction, the second alignment direction in each of the n regions being different, wherein the second alignment direction is same as the first alignment direction in a same region;
forming a first organic film layer on the first substrate having a first polarization direction, the first polarization direction in each of the n regions being different;
forming a second organic film layer on the second substrate having a second polarization direction, the second polarization direction in each of the n regions being different; and
forming a liquid crystal layer disposed between the first substrate and the second substrate.

17. The method according to claim 16, wherein:
the first organic film layer is formed on a far side of the first substrate away from the liquid crystal layer;
the second organic film layer is formed on a far side of the second substrate away from the liquid crystal layer; and
the first polarization direction is perpendicular to the second polarization direction in a same region.

18. The method according to claim 17, further including:
forming a plurality of stripe-shaped electrodes between the second substrate and the second alignment layer, wherein:
each stripe-shaped electrode having an orientation direction;
each region includes at least one stripe-shaped electrode;
the orientation direction of the stripe-shaped electrode in each of the n regions is different;
the orientation direction of the stripe-shaped electrode forms an angle with the first alignment direction; and
within a region group, the angle between the orientation direction of the stripe-shaped electrode and the first alignment direction in each of the n regions is the same.

19. The method according to claim 16, wherein forming the first alignment layer or the second alignment layer further includes:
forming an alignment material layer;
providing n masks, wherein an $m^{th}$ mask correspondingly exposes an $m^{th}$ region of the alignment material layer, $1 \leq m \leq n$, and blocks other regions;
irradiating the $m^{th}$ region of the alignment material layer with polarized ultraviolet light through the $m^{th}$ mask to form the first alignment layer or the second alignment layer, wherein the polarization directions of the polarized ultraviolet light received by the n regions are different.

20. The method according to claim 16, wherein forming the first organic film layer or the second organic film layer further includes:

forming an organic material layer;

providing n masks, wherein an $m^{th}$ mask correspondingly exposes an $m^{th}$ region of the organic material layer, $1 \leq m \leq n$, and blocks other regions;

irradiating the $m^{th}$ region of the organic material layer with polarized ultraviolet light through the $m^{th}$ mask to form the first organic film layer or the second organic film layer, wherein the polarization directions of the polarized ultraviolet light received by the n regions are different.

* * * * *